(12) United States Patent
Doura

(10) Patent No.: US 12,011,705 B2
(45) Date of Patent: Jun. 18, 2024

(54) METHOD AND COMPOSITION

(71) Applicant: Johnson Matthey Public Limited Company, London (GB)

(72) Inventor: Kevin Doura, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/647,358

(22) Filed: Jan. 7, 2022

(65) Prior Publication Data

US 2022/0219145 A1    Jul. 14, 2022

Related U.S. Application Data

(60) Provisional application No. 63/199,567, filed on Jan. 8, 2021.

(30) Foreign Application Priority Data

Mar. 9, 2021   (EP) .................................... 21161448

(51) Int. Cl.
*B01J 21/06*        (2006.01)
*B01D 53/94*        (2006.01)
(Continued)

(52) U.S. Cl.
CPC .............. *B01J 23/42* (2013.01); *B01D 53/94* (2013.01); *B01J 21/063* (2013.01); *B01J 21/12* (2013.01);
(Continued)

(58) Field of Classification Search
CPC ........ B01J 21/063; B01J 21/066; B01J 21/08; B01J 21/12; B01J 23/42; B01J 23/44;
(Continued)

(56) References Cited

U.S. PATENT DOCUMENTS 3,301,794 A * 1/1967 Cramer .................... B01J 29/06
502/8
4,774,217 A     9/1988 Takeuchi et al.
(Continued)

FOREIGN PATENT DOCUMENTS

EP          0211233 A1    2/1987
EP          0596552 A1    5/1994
(Continued)

*Primary Examiner* — Cam N. Nguyen
(74) *Attorney, Agent, or Firm* — BakerHostetler

(57) ABSTRACT

The present invention relates to a method of preparing a catalyst article comprising steps: (a) preparing a washcoat composition by combining at least the following components: a support material comprising a mixed oxide, a mixture of oxides or a molecular sieve comprising (i) alumina and (ii) silica and/or zirconia; a metal oxide sol comprising at least one of titania, silica or zirconia; a liquid medium; (b) applying the washcoat composition to a substrate to form a washcoating; and (c) drying and/or calcining the washcoating; wherein the method further comprises a step of impregnating the support material with a platinum group metal component. The prepared catalyst article may be suitable for the treatment of emissions from an internal combustion engine or a gas turbine, for example, the treatment of carbon monoxide and/or formaldehyde emissions from a natural gas fueled internal combustion engine or gas turbine.

17 Claims, 3 Drawing Sheets

(51) Int. Cl.
*B01J 21/12* (2006.01)
*B01J 23/42* (2006.01)
*B01J 23/44* (2006.01)
*B01J 35/04* (2006.01)
*B01J 35/10* (2006.01)
*B01J 35/56* (2024.01)
*B01J 35/61* (2024.01)
*B01J 37/02* (2006.01)
*B01J 37/03* (2006.01)
*B01J 37/04* (2006.01)
*B01J 37/08* (2006.01)
*F01N 3/28* (2006.01)

(52) U.S. Cl.
CPC ............. *B01J 35/56* (2024.01); *B01J 35/613* (2024.01); *B01J 35/615* (2024.01); *B01J 37/0213* (2013.01); *B01J 37/038* (2013.01); *B01J 37/04* (2013.01); *B01J 37/082* (2013.01); *F01N 3/2803* (2013.01); *B01D 2255/1021* (2013.01); *B01D 2255/20707* (2013.01); *B01D 2255/30* (2013.01); *B01D 2255/9155* (2013.01); *F01N 3/2842* (2013.01); *F01N 2370/04* (2013.01)

(58) Field of Classification Search
CPC .... B01J 35/04; B01J 35/1014; B01J 35/1019; B01J 37/0213; B01J 37/038; B01J 37/04; B01J 37/082
USPC ........ 502/258–262, 332–334, 339, 349–351, 502/355, 415, 439
See application file for complete search history.

(56) References Cited

U.S. PATENT DOCUMENTS

| | | | | |
|---|---|---|---|---|
| 5,316,996 A * | 5/1994 | Itoh | ............ | B01J 21/063 502/238 |
| 6,159,897 A | 12/2000 | Suzuki | | |
| 6,165,430 A * | 12/2000 | Kudla | ............ | B01D 53/944 502/238 |
| 6,559,086 B1 | 5/2003 | Takahashi | | |
| 6,855,661 B2 * | 2/2005 | Kim | ............ | B01D 53/945 502/223 |
| 8,969,237 B2 * | 3/2015 | Yin | ............ | B01J 23/44 427/446 |
| 9,034,287 B2 * | 5/2015 | Gerlach | ............ | B01J 23/42 423/213.5 |
| 9,561,494 B2 * | 2/2017 | Kato | ............ | B01J 23/466 |
| 9,586,179 B2 * | 3/2017 | Yin | ............ | B01D 53/945 |
| 10,537,879 B2 * | 1/2020 | Bergeal | ............ | B01D 53/94 |
| 10,722,876 B2 * | 7/2020 | Liu | ............ | B01J 37/02 |
| 10,744,496 B2 * | 8/2020 | Chandler | ............ | B01J 35/0006 |
| 11,110,446 B2 * | 9/2021 | Liu | ............ | B01J 35/0006 |
| 11,130,116 B2 * | 9/2021 | Lapadula | ............ | B01J 23/42 |
| 11,590,482 B1 * | 2/2023 | Reid | ............ | B01J 29/80 |
| 2002/0198098 A1 | 12/2002 | Yamamoto et al. | | |
| 2018/0243729 A1 | 8/2018 | Lapadula | | |
| 2019/0126247 A1 * | 5/2019 | Deeba | ............ | B01J 37/0236 |
| 2019/0160427 A1 * | 5/2019 | Deeba | ............ | B01J 37/0228 |
| 2019/0240643 A1 * | 8/2019 | Karpov | ............ | B01J 23/44 |
| 2022/0212178 A1 * | 7/2022 | Liu | ............ | F01N 3/2842 |

FOREIGN PATENT DOCUMENTS

| | | | |
|---|---|---|---|
| EP | 1068892 | A2 | 1/2001 |
| JP | 7-155613 | A | 6/1995 |
| JP | 8-99034 | A | 4/1996 |
| JP | 8-150335 | A | 6/1996 |
| JP | 11-128687 | A | 5/1999 |
| JP | 2001-224965 | A | 8/2001 |
| JP | 2004-33990 | A | 2/2004 |
| JP | 2004-527372 | A | 9/2004 |
| WO | 99/13981 | A1 | 3/1999 |
| WO | 0137978 | A1 | 5/2001 |
| WO | 02/089977 | A1 | 11/2002 |
| WO | 2013088128 | A1 | 6/2013 |
| WO | 2020188518 | A1 | 9/2020 |

* cited by examiner

METHOD AND COMPOSITION

FIELD OF THE INVENTION

The present invention relates to a method of preparing a catalyst article for treating exhaust gas generated by power generating apparatus such as an engine or a turbine, in particular, natural gas fueled engines and turbines. The invention further relates to a washcoat composition suitable for use in such a method.

BACKGROUND OF THE INVENTION

In normal operation, natural gas fuelled turbines and engines generate significant amounts of carbon dioxide ($CO_2$), water, carbon monoxide (CO), volatile organic compounds (VOCs), such as formaldehyde, and oxides of nitrogen (NOx) as part of the combustion process.

Recent environmental regulations have increased the emphasis on the importance of reducing the levels of partially burned fuel constituents from the exhaust of such turbines and engines. These regulated exhaust emissions include carbon monoxide (CO) and formaldehyde ($CH_2O$).

Catalytic converters may be employed for the treatment of emissions from such engines. A catalytic converter converts such emissions in the exhaust gases to less harmful substances before they are emitted to the atmosphere. Catalytic converters typically comprise a suitable substrate coated with a catalytically active material.

In the production of a coated catalyst, a composition known as a "washcoat" is applied to a substrate (e.g. a ceramic monolith). The washcoat may take the form of a solution, slurry or suspension of catalytic material in a liquid medium. Once coated onto the substrate, the washcoat typically undergoes a calcination step, to remove the liquid medium and to fix the catalytically active material to the substrate.

Known catalysts suitable for catalysing the oxidation of CO and formaldehyde typically employ one or more platinum group metals (PGMs) supported on a suitable catalyst support. The catalyst support may be a high surface area refractory metal oxide such as alumina or silica. However, known oxidation catalysts may deactivate over time. Further, certain components present in fuel or lubricating oils may lead to poisoning of the catalyst. For example, in the operation of two-stroke engines, sulfur in the exhaust stream deriving from engine oil is a major contributor to catalyst poisoning.

There remains a need for improved oxidation catalysts, in particular, for use in the treatment of CO and formaldehyde emissions from natural gas fueled engines and turbines.

SUMMARY OF THE INVENTION

According to an aspect of the present disclosure, there is provided a method of preparing a catalyst article comprising:
(a) preparing a washcoat composition by combining at least the following components:
    a support material comprising a mixed oxide, a mixture of oxides or a molecular sieve comprising (i) alumina and (ii) silica and/or zirconia;
    a metal oxide sol comprising at least one of titania, silica or zirconia;
    a liquid medium;
(b) applying the washcoat composition to a substrate to form a washcoating; and
(c) drying and/or calcining the washcoating;
wherein the method further comprises a step of impregnating the support material with a platinum group metal component.

According to a further aspect of the present disclosure, there is provided a washcoat composition comprising:
a support material comprising a mixed oxide, a mixture of oxides or a molecular sieve comprising (i) alumina and (ii) silica and/or zirconia, which support material is optionally impregnated with a platinum group metal component;
a metal oxide sol comprising at least one of titania, silica or zirconia;
a liquid medium.

Advantageously, it has been found that catalysts prepared according to the method described above may provide improved CO and/or formaldehyde oxidation stability (i.e. maintained activity over time). Further, improved and/or comparable oxidation activity compared to known catalysts may be achieved whilst using lower amounts of PGM. Further still, improved tolerance to catalyst poisons, in particular, improved sulfur tolerance may be achieved.

Furthermore, catalysts prepared according to the method described herein using may find application in other stationary emissions control applications, for example, in the treatment of exhaust gases from industrial processes or in indoor air treatment systems. In particular, a catalyst article prepared according to the method of the present invention may be useful in the decomposition of ozone ($O_3$) present in gas streams.

DETAILED DESCRIPTION

Figure 1:
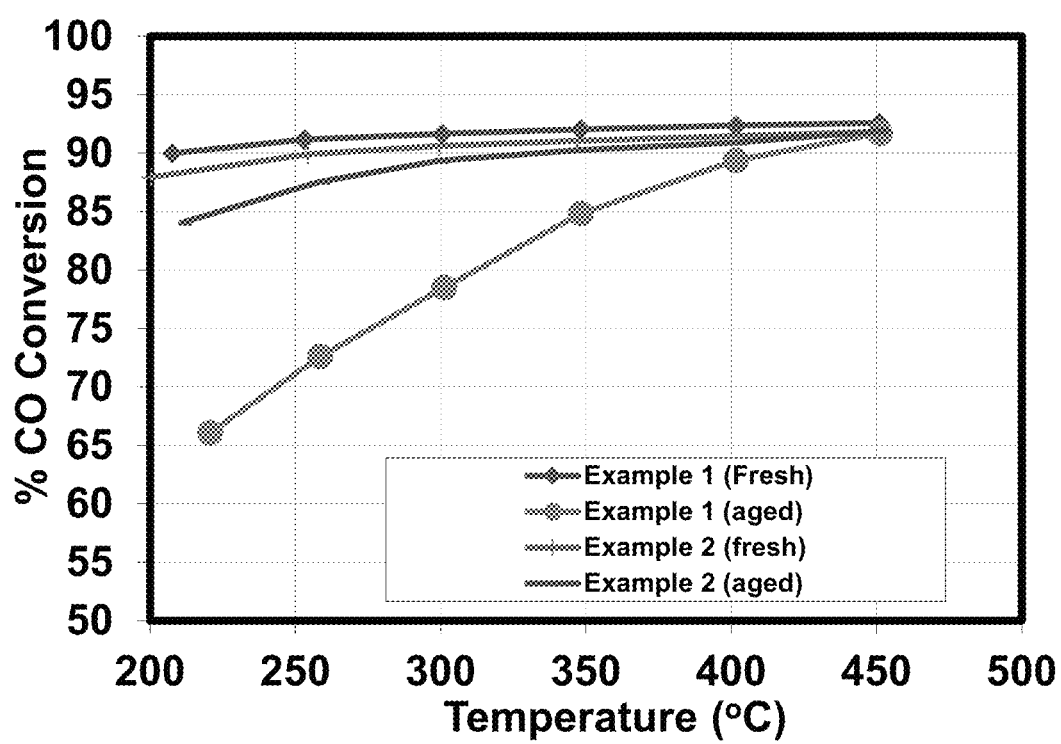
FIG. 1 is a graph showing the CO oxidation activity achieved by a catalyst article prepared according to the method of the present disclosure compared to that achieved by a prior art catalyst.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Further, the term "comprising" as used herein can be exchanged for the definitions "consisting essentially of" or "consisting of". The term "comprising" is intended to mean that the named elements are essential, but other elements may be added and still form a construct within the scope of a claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The washcoat composition may be prepared by combining the required components and any optional additives. The combination of components may be carried out by mixing, for example by stirring. Preferably, the components are mixed such that the washcoat composition is substantially uniform (e.g. homogeneous), that is, the distribution of components throughout the washcoat is substantially even.

The support material comprises a mixed oxide, a mixture of oxides or a molecular sieve comprising (i) alumina and (ii) silica and/or zirconia. Preferably, the support material is a mixed oxide. The term "mixed oxide" as used herein refers to a mixture of oxides in a single phase. For example, the mixed oxide material may be a silica-alumina mixed oxide or a zirconia-alumina mixed oxide. Alternatively, the support material may be an aluminosilicate molecular sieve (zeolite).

Preferably, the support material is a silica-alumina mixed oxide. The silica-alumina mixed oxide may have a silica content in the range 1 to 40 wt %, 2 to 35 wt %, 5 to 35 wt % or 5 to 30 wt %. For example, the silica-alumina mixed oxide may have a silica content in the range 2 to 10 wt %, such as about 5 wt %. Alternatively, the silica-alumina mixed oxide may have a silica content in the range 25 to 40 wt %, such as about 30 wt %.

In general, the support material for use in the present invention is in particulate form. The support material may have a D90 particle size of ≤50 µm, ≤30 µm, ≤20 µm or ≤10 µm. The particles may be obtained by milling.

The term "D90 particle size" as used herein refers to particle size distribution. A value for D90 particle size corresponds to the particle size value below which 90%, by volume, of the total particles in a particular sample lie. The D90 particle size may be determined using a laser diffraction method (e.g. using a Malvern Mastersizer 2000). The quantity of the support material present in the washcoat composition may be selected to provide a loading of support material in the final catalyst article of 0.5 to 4 g/in$^3$, preferably 1 to 2 g/in$^3$. This is well within the capabilities of the skilled person.

The term "loading" as used herein and by convention defines a concentration quantity of a component present in a catalyst layer on a substrate. The units of loading are generally expressed in g/ft$^3$ or g/in$^3$ and relate to the volume of the substrate that is used.

The step of impregnating the support material with a platinum group metal component may be carried out prior to combination of the support material with the other components of the washcoat (i.e. prior to step (a) of the method described herein). For example, the impregnation may be carried out by contacting the support material with an impregnation solution comprising the platinum group metal component. The impregnated support material may be dried and/or calcined prior to its combination with the other components of the washcoat composition.

Alternatively, the support material may be impregnated with a platinum group metal component subsequent to step (a) and prior to step (b). For example, the washcoat composition prepared in step (a) may be blended with an impregnation solution prior to its application onto a substrate in step (b).

Alternatively, the support material may be impregnated with a PGM component subsequent to step (c) of the method, whereby the impregnation may be carried out by contacting the substrate with an impregnation solution comprising the platinum group metal component. Contact of the washcoated substrate with the impregnation solution may be effected by applying an impregnation solution to the substrate (e.g. on top of the dried and/or calcined washcoating) to form a second coating. Thus, the method may further comprise steps: (d) applying an impregnation solution to the substrate to form a second coating, wherein the impregnation solution comprises the platinum group metal component; and (e) drying and/or calcining the second coating.

The impregnation solution may be an aqueous solution of the platinum group metal component.

The platinum group metal component may be a salt of a platinum group metal (PGM). In particular, the platinum group metal component may be a nitrate salt of a PGM, an acetate salt of a PGM or a carboxylate salt of a PGM. The PGM may be ruthenium (Ru), rhodium (Rh), palladium (Pd), osmium (Os), iridium (Ir), platinum (Pt) or mixtures thereof. Preferably, the PGM is platinum, palladium or a mixture of platinum or palladium. More preferably, the PGM is platinum. Suitable platinum group metal components include a platinum nitrate or a platinum acetate, such as tetraammine platinous acetate.

The quantity of platinum group metal component employed may be chosen such that the final catalyst layer formed on the substrate comprises a platinum group metal loading in the range 1 to 100 g/ft$^3$ of platinum group metal, for example, 4 to 90 g/ft$^3$, 8 to 50 g/ft$^3$, or 20 to 35 g/ft$^3$.

The above described drying steps may be carried out at temperatures of less than 120° C., for example, at a temperature of about 100° C. Calcination steps may be carried out at temperatures up to 550° C., preferably in the range 450 to 550° C., for a period of up to 3 hours, preferably from 30 minutes to 2 hours.

The metal oxide sol comprises at least one of titania, silica or zirconia. As used herein, the term "metal oxide sol" refers to a colloid comprising a particulate metal oxide having a BET surface area of at least 100 m$^2$/g dispersed in a continuous liquid medium. Preferably, the metal oxide sol is a titania sol (i.e. a colloid comprising particulate titania having a specific surface area of at least 100 m$^2$/g dispersed in a continuous liquid medium).

The liquid medium of the metal oxide sol may be aqueous.

The metal oxide of the metal oxide sol may have a BET surface area of ≥100 m$^2$/g, ≥150 m$^2$/g, ≥200 m$^2$/g, ≥250 m$^2$/g or ≥300 m$^2$/g.

The metal oxide sol may be a titania sol, in which the titania has a BET surface area of ≥250 m$^2$/g or ≥300 m$^2$/g.

The metal oxide sol may be acidic or basic. Preferably, the metal oxide sol is acidic. For example, the metal oxide sol may have a pH of in the range 0.5 to 5, such as 0.5 to 3 or 0.5 to 2.

The metal oxide particles of the sol may have a D50 particle size of ≤1 microns, for example ≤0.5 microns or ≤0.2 microns. The metal oxide particles of the sol may have a D90 particle size of ≤5 microns, for example ≤2 microns, ≤1 microns or ≤0.5 microns.

The term "D50 particle size" as used herein refer to particle size distribution. A value for D50 particle size corresponds to the particle size value below which 50%, by volume, of the total particles in a particular sample lie. The D50 particle size may be determined using a laser diffraction method (e.g. using a Malvern Mastersizer 2000).

The quantity of metal oxide sol employed may be chosen such that the final catalyst layer formed on the substrate comprises a loading of the metal oxide of up to 2.5 g/in$^3$, for example ≤2 g/in$^3$, ≤1 g/in$^3$, ≤0.5 g/in$^3$ or ≤0.2 g/in$^3$.

The washcoat composition further comprises a liquid medium, in which the other components are suspended or solvated. The liquid medium may be aqueous, for example, the liquid medium may be water. Preferably, the liquid medium consists essentially of water. That is the liquid medium contains water but may also contain minor non-aqueous (e.g. organic or inorganic) impurities. The water may be deionised or demineralised water.

The washcoat composition may have a solids content of up to 50 wt %. By "solids content" it is meant the proportion of solid material present in the washcoat composition based on the total weight of the composition. The solids content of the washcoat composition is preferably in the range 20 to 40 wt %, more preferably in the range 30 to 35 wt %.

The washcoat composition may have an acidic pH. For example, the pH of the washcoat may be <7 or ≤5. For example, the washcoat composition may have a pH of about 3.

The washcoat composition may have a viscosity in the range 100-1000 centipoise.

The washcoat composition may further comprise organic additives such as rheology modifiers, dispersants and/or other additives.

The relative quantities of each component employed in the washcoat composition may be selected such that the washcoat has the desired solids content.

Preferred substrates include flow-through monoliths having a so-called honeycomb geometry that comprise multiple adjacent, parallel channels that are open on both ends and generally extend from the inlet face to the outlet face of the substrate and result in a high-surface area-to-volume ratio. The catalyst composition is coated onto the walls of the channels such that, in use, the exhaust gas contacts the catalyst as it flows through the channels.

The monolith substrate may be an inert substrate. The substrate may be composed of a ceramic material or a metallic material. For example, the substrate may be made or composed of cordierite ($SiO_2$—$Al_2O_3$—$MgO$), silicon carbide (SiC), Fe—Cr—Al alloy, Ni—Cr—Al alloy, aluminum titanate or a stainless-steel alloy.

The shape, size and cell density of the honeycomb substrate is typically selected to optimise exposure of the catalytically active materials in the catalyst article to the exhaust gas in use. For example, where the intended use of the catalyst article is in the treatment of emissions from a natural gas fueled internal combustion engine (such as a two-stroke reciprocating engine), the substrate may be cylindrical or substantially cylindrical in shape, having a diameter in the range 20 to 40 inches. The cell density may be in the range 100 to 400 cpsi (cells per square inch) or 200 to 400 cpsi, for example about 300 cells per square inch.

Alternatively, where the intended use of the catalyst article is in the treatment of emissions from gas turbines, the substrate may be square or rectangular in cross section. Typically, in such an application, multiple washcoated substrates are stacked side by side in a grid formation to fill a flue duct. Such substrates may have a cross sectional area of about 24×24 inches and a depth of about 3.5 inches. The cell density may be in the range 100 to 400 cpsi, for example 200-300 cpsi.

One method of applying a washcoating to a honeycomb substrate involves positioning the substrate such that the channels have a substantially vertical orientation, applying washcoat composition to a first face of the substrate (e.g. an upper face) and subjecting an opposite, second face (e.g. a lower face) of the substrate to at least a partial vacuum to achieve movement of the washcoat composition through the channels. The monolith substrate may be coated in a single dose wherein washcoat may be applied to the substrate in a single step with the substrate remaining in a single orientation. Alternatively, the substrate may be coated in two doses. For example, in a first dose the monolith substrate is in a first orientation with a first face uppermost and a second face is lowermost. A coating is applied to the first face and coats a portion of the length of the substrate. The substrate is then inverted so that the second face is uppermost. A coating is then applied to the second face in order to coat the portion of the substrate that was uncoated by the first dose. WO 99/47260 describes a general method for coating a monolithic substrate.

Other methods of coating the substrate include immersing the substrate in the washcoat composition or passing the substrate through a curtain or waterfall of the washcoat composition. Compressed air may be employed to blow the fluid into and through the substrate, ensuring coating of the cells and also ensuring that there are no or practically no blocked cells.

Where the method further comprises steps (d) and (e) defined above, application of the impregnation solution to the substrate to form a second coating may be carried out in an analogous manner to application of the washcoating in step (b).

The present disclosure further provides a catalyst article obtained or obtainable by the method described above or using the washcoat composition described above. In particular, such a catalyst article comprises a substrate having a layer of catalytic material coated thereon. The catalytic material may comprise a support material impregnated with a PGM component, wherein the support material comprises a mixed oxide, a mixture of oxides or a molecular sieve comprising (i) alumina and (ii) silica and/or zirconia; and a metal oxide having a BET surface area of at least 100 $m^2$/g, at least 150 $m^2$/g, at least 200 $m^2$/g, at least 250 $m^2$/g or at least 300 $m^2$/g wherein the metal oxide comprises at least one of titania, silica or zirconia. Preferably, the support material is a silica-alumina mixed oxide and the metal oxide is titania.

The catalyst article obtainable by the above process may be employed in the treatment of an exhaust gas from an internal combustion engine (such as a diesel engine or a natural gas or methanol fueled internal combustion engine) or a gas turbine. In particular, the catalyst article may be used to reduce formaldehyde and/or carbon monoxide emissions from a natural gas fueled internal combustion engine or a natural gas fueled turbine. Additionally, the catalyst article may be used in the decomposition of ozone ($O_3$) present in exhaust gases or air streams.

EXAMPLES

The invention will now be further described with reference to the following examples, which are illustrative, but not limiting of the invention.

Comparative Example 1

Alumina powder was slurried in water and milled to a d50<10 micron. The slurry had a solids content of ≤50% and a pH of ≤7. The slurry was applied as a washcoat to a 200 cells per square inch (cpsi) metallic honeycomb monolith substrate. The coated substrate was dried and then calcined at a temperature of 525° C. An impregnation solution was prepared with tetraammine platinous acetate. The impregnation solution was coated onto the washcoated metallic substrate and dried. The impregnated coated substrate was then calcined at 525° C. The resulting catalyst had a total PGM loading of 8.25 g $ft^{-3}$ Pt. The alumina loading was 1.6 g/$in^{-3}$.

Example 2

An alumina-silica (70% alumina, 30% silica) mixed oxide powder was slurried in water and milled to a d50<10 micron. The slurry had a solids content of less than 50% and a pH of less than 7. A titania-sol having a surface area of ≥300 m²/g, a pH of about 1, D50 and D90 particle sizes of <0.2 microns and <0.5 microns respectively and a $TiO_2$ content of approximately 20 wt % was added to the washcoat and mixed for 1 hour with a high shear mixer. The resulting slurry was then applied as a washcoat to a 200 cpsi metallic honeycomb monolith substrate and dried. An impregnation solution was prepared comprising platinum nitrate in acidic solution. The impregnation solution was applied to the washcoated metallic substrate and dried. The impregnated coated substrate was then calcined at 525° C. The resulting catalyst had a total PGM loading of 8.25 g ft$^{-3}$ Pt. The alumina-silica loading was 1.6 g/in$^{-3}$ and the titania loading was 0.178 g/in$^{-3}$.

Comparative Example 3

An alumina-silica (70% alumina, 30% silica) mixed oxide powder was slurried in water and milled to a d50<10 micron. The slurry had a solids content of less than 50% and a pH of less than 7. The resulting slurry was then applied as a washcoat to a 200 cpsi metallic honeycomb monolith substrate and dried. An impregnation solution was prepared comprising platinum nitrate in acidic solution. The impregnation solution was applied to the washcoated metallic substrate and dried. The impregnated coated substrate was then calcined at 525° C. The resulting catalyst had a total PGM loading of 8.25 g ft-3 Pt. The alumina-silica loading was 0.8 g/in-3.

Example 4

An alumina-silica (70% alumina, 30% silica) mixed oxide powder was slurried in water and milled to a d50<10 micron. The slurry had a solids content of less than 50% and a pH of less than 7. A titania-sol having a surface area of ≥300 m²/g, a pH of about 1, D50 and D90 particle sizes of <0.2 microns and <0.5 microns respectively and a $TiO_2$ content of approximately 20 wt % was added to the washcoat and mixed for 1 hour with a high shear mixer. The resulting slurry was then applied as a washcoat to a 200 cpsi metallic honeycomb monolith substrate and dried. An impregnation solution was prepared comprising platinum nitrate in acidic solution. The impregnation solution was applied to the washcoated metallic substrate and dried. The impregnated coated substrate was then calcined at 525° C. The resulting catalyst had a total PGM loading of 4 g ft-3 Pt. The alumina-silica loading was 1.6 g/in-3 and the titania loading was 0.178 g/in-3.

Carbon Monoxide Oxidation Activity

Identical volume (1.0×3.5 inches) core samples were taken from the catalyst articles prepared in each of the above Examples and tested in a synthetic catalytic activity test (SCAT) apparatus using the following inlet gas mixture at selected inlet temperatures: 50 ppm CO, 20 ppm NO, 15 ppm C1 propene, 15% $O_2$, 8% $H_2O$, 3% $CO_2$ and balance $N_2$ at 200,000 hr-1 GHSV. The catalyst samples were tested both in a fresh condition and after hydrothermal sulfur ageing (25 ppm $SO_2$, 15% $O_2$, 8% $H_2O$, 3% $CO_2$ and balance $N_2$, at 250° C. for 24 hours).

The results relating to Comparative Example 1 and Example 2 are shown in FIG. 1. FIG. 1 compares the CO conversion rate achieved by the catalyst articles of Examples 1 and 2 at selected inlet temperatures.

Figure 2:
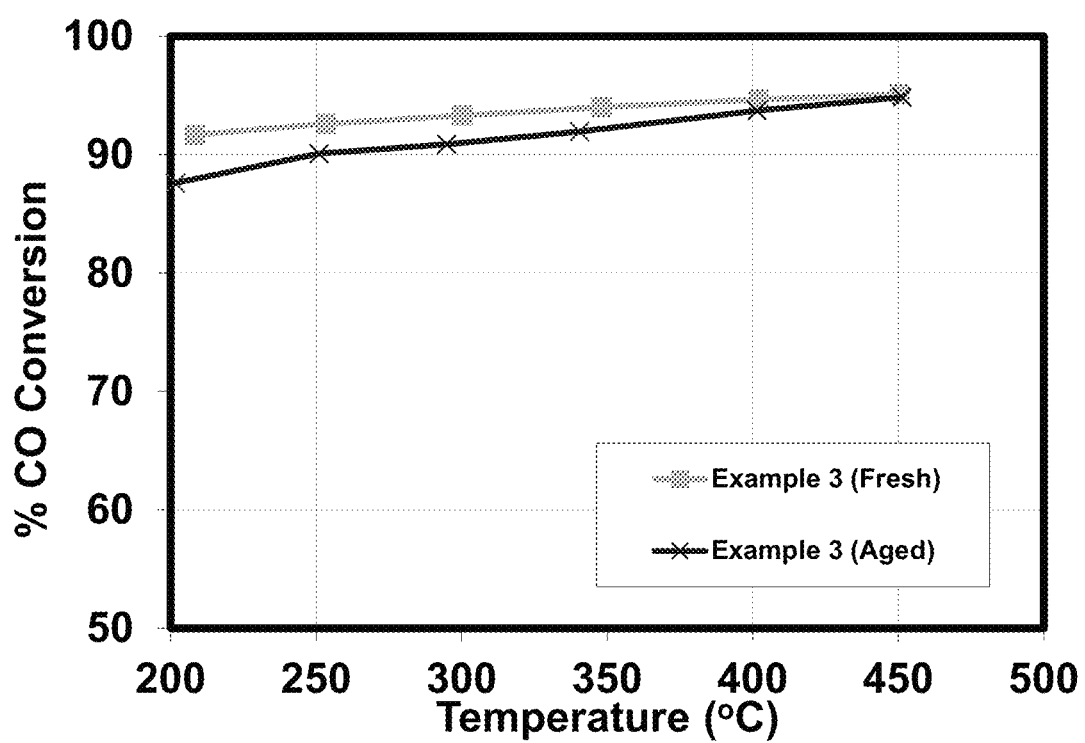
FIG. 2 is a graph showing the CO oxidation activity achieved by a comparative catalyst article.
Figure 3:
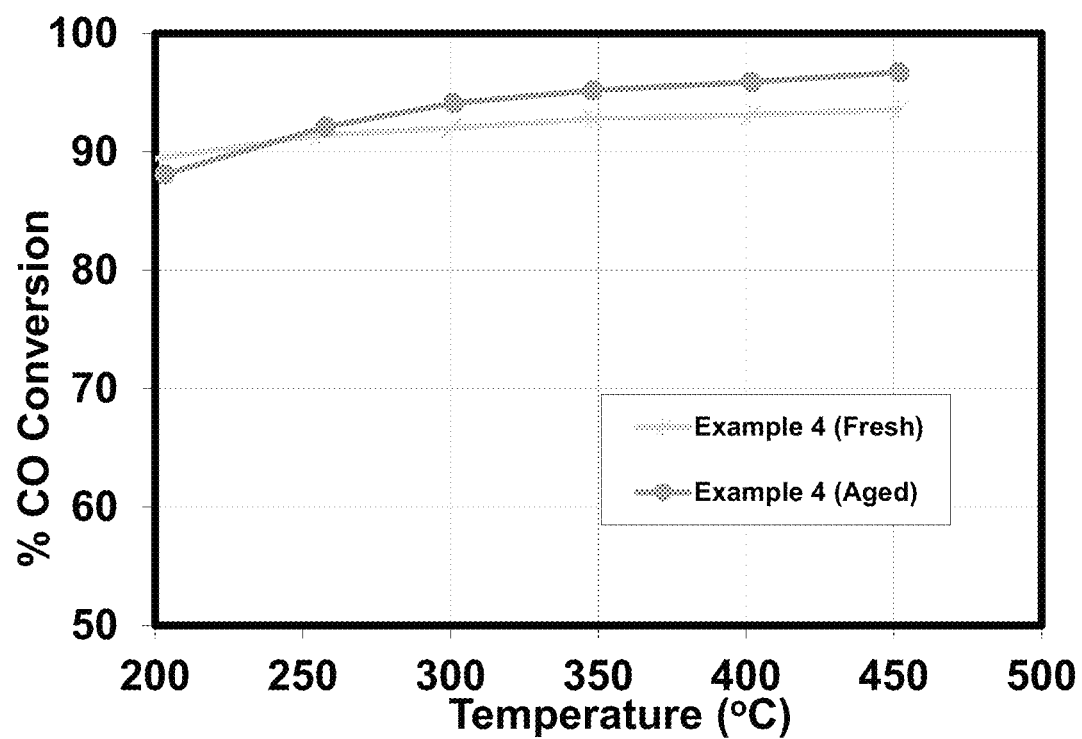
FIG. 3 is a graph showing the CO oxidation activity achieved by a catalyst article prepared according to the method of the present disclosure.

The results relating to Comparative Example 3 and Example 4 are shown in FIGS. 2 and 3. FIG. 2 compares the CO conversion rate achieved by the catalyst article of Comparative Example 3 at selected inlet temperatures. FIG. 3 compares the CO conversion rate achieved by the catalyst article of Example 4 at selected inlet temperatures.

As demonstrated by the data shown in FIG. 1, whilst both catalyst articles achieve comparable CO oxidation rates in a fresh condition, after sulfur-ageing the CO oxidation activity of the catalyst article prepared in Example 2 is significantly improved compared to the catalyst article of Example 1.

As demonstrated by the data shown in FIGS. 2 and 3, in both fresh and aged conditions, the catalyst article of Example 4 provides comparable or improved CO oxidation rates compared to the catalyst article of Comparative Example 3, despite the PGM loading being significantly reduced.

Further aspects and embodiments of the present disclosure are set out in the following numbered clauses:

Clauses:
1. A method of preparing a catalyst article comprising steps:
   (a) preparing a washcoat composition by combining at least the following components:
      a support material comprising a mixed oxide, a mixture of oxides or a molecular sieve comprising (i) alumina and (ii) silica and/or zirconia;
      a metal oxide sol comprising at least one of titania, silica or zirconia;
      a liquid medium;
   (b) applying the washcoat composition to a substrate to form a washcoating; and
   (c) drying and/or calcining the washcoating;
   wherein the method further comprises a step of impregnating the support material with a platinum group metal component.
2. A method as defined in clause 1, wherein step (a) comprises mixing the components together via stirring.
3. A method as defined in clause 1 or 2, wherein the support material comprises a mixed oxide.
4. A method as defined in clause 1 or 2, wherein the support material is a silica-alumina mixed oxide, a zirconia-alumina mixed oxide or an aluminosilicate molecular sieve.
5. A method as defined in any preceding clause wherein the support material is a silica-alumina mixed oxide.
6. A method as defined in clause 5, wherein the silica-alumina mixed oxide has a silica content in the range 1 to 40 wt %, 2 to 35 wt %, 5 to 35 wt % or 5 to 30 wt %.
7. A method as defined in any of clauses 1 to 5, wherein the silica-alumina mixed oxide has a silica content in the range 2 to 10 wt %.
8. A method as defined in clause 7, wherein the silica-alumina mixed oxide has a silica content of about 5 wt %.
9. A method as defined in any of clauses 1-5, wherein the silica-alumina mixed oxide has a silica content in the range 25 to 40 wt %.
10. A method as defined in clause 9, wherein the silica-alumina mixed oxide has a silica content of about 30 wt %.
11. A method as defined in any preceding clause, wherein the support material has a D90 particle size of ≤50 μm or ≤30 μm.

12. A method as defined in any preceding clause, wherein the quantity of support material employed in step (a) is selected such that the catalyst article prepared comprises a support material loading in the range 0.5 to 4 g/in³, preferably 1 to 2 g/in³.
13. A method as defined in any preceding clause, wherein the support material is impregnated with PGM component prior to step (a) by contacting the support material with an impregnation solution, wherein the impregnation solution comprises the PGM component.
14. A method as defined in any of clauses 1 to 13, wherein the support material is impregnated with PGM component subsequent to step (a) and prior to step (b) by blending the washcoat composition formed in step (a) with an impregnation solution comprising the PGM component.
15. A method as defined in any of clauses 1 to 13, wherein the support material is impregnated with platinum group metal component subsequent to step (c) by contacting the substrate with an impregnation solution, wherein the impregnation solution comprises the platinum group metal component.
16. A method as defined by any of clauses 1 to 13, wherein the support material is impregnated with platinum group metal component subsequent to step (c), and the method further comprises:
    (d) applying an impregnation solution to the substrate to form a second coating, wherein the impregnation solution comprises the PGM component; and
    (e) drying and/or calcining the second coating.
17. A method as defined in any of the preceding clauses, wherein the platinum group metal component comprises platinum, palladium or a mixture of platinum and palladium.
18. A method as defined in clause 17, wherein the platinum group metal component comprises platinum.
19. A method as defined in clause 18, wherein the platinum group metal component is a platinum nitrate or a platinum acetate.
20. A method as defined in any of clauses 13 to 16, or any of clauses 17 to 19 when dependent on any of clauses 13 to 16, wherein the impregnation solution is an aqueous solution of the platinum group metal component.
21. A method as defined in any preceding clause wherein the quantity of platinum group metal employed in the impregnation step is selected such that the catalyst article prepared comprises a platinum group metal loading in the range 1 to 100 g/ft³, 4 to 90 g/ft³, 8 to 50 g/ft³ or 20 to 35 g/ft³.
22. A method as defined in any preceding clause, wherein in step (c) the washcoating is dried at a temperature of less than 120° C.
23. A method as defined in any preceding clause, wherein in step (c) the washcoating is calcined at a temperature in the range 450 to 550° C.
24. A method as defined in clause 16 or any of clauses 17 to 23 when dependent on clause 16, wherein in step (e) the second coating is dried at a temperature of less than 120° C.
25. A method as defined in clause 16 or any of clauses 17 to 24 when dependent on clause 16, wherein in step (e) the second coating is calcined at a temperature in the range 450 to 550° C.
26. A method as defined in any preceding clause, wherein the metal oxide sol is a titania sol.
27. A method as defined in any preceding clause, wherein the metal oxide of the metal oxide sol has a BET surface area of $\geq 100$ m²/g, $\geq 150$ m²/g, $\geq 200$ m²/g, $\geq 250$ m²/g or $\geq 300$ m²/g.
28. A method as defined in any preceding clause, wherein the metal oxide sol has a D50 particle size of $\leq 1$ μm, $\leq 0.5$ μm or $\leq 0.2$ μm.
29. A method as defined in any preceding clause, wherein the metal oxide sol has a D90 particle size of $\leq 5$ μm, $\leq 2$ μm, $\leq 1$ μm or $\leq 0.5$ μm.
30. A method as defined in any preceding clause, wherein the quantity of metal oxide sol employed in step (a) is selected such that the catalyst article prepared has a metal oxide loading of $\leq 2.5$ g/in³, $\leq 2$ g/in³, $\leq 1$ g/in³, $\leq 0.5$ g/in³ or $\leq 0.2$ g/in³.
31. A method as defined in any preceding clause, wherein the liquid medium is water.
32. A method as defined in any preceding clause, wherein the washcoat composition prepared in step (a) has a solids content of up to 50 wt %.
33. A method as defined in clause 32, wherein the washcoat composition prepared in step (a) has a solids content in the range 20 to 40 wt % or 30 to 35 wt %.
34. A method as defined in any preceding clause, wherein the washcoat composition prepared in step (a) has a pH of <7, $\leq 5$ or about 3.
35. A method as defined in any preceding clause, wherein the washcoat composition prepared in step (a) has a viscosity in the range 100-1000 centipoise.
36. A method as defined in any preceding clause, wherein the substrate is a flow-through monolith substrate.
37. A method as defined in clause 36, wherein the substrate is substantially cylindrical in shape and has a diameter in the range 20 to 40 inches and a cell density in the range 200 to 400 cpsi.
38. A method as defined in clause 36, wherein the substrate has a substantially square or rectangular cross-section.
39. A washcoat composition comprising:
    a support material comprising a mixed oxide, mixture of oxides or a molecular sieve comprising (i) alumina and (ii) silica and/or zirconia;
    a metal oxide sol comprising at least one of titania, silica or zirconia;
    a liquid medium.
40. A washcoat composition as defined in clause 38, wherein the support material comprises a mixed oxide.
41. A washcoat composition as defined in any of clauses 38 to 39, wherein the support material is a silica-alumina mixed oxide, a zirconia-alumina mixed oxide or an aluminosilicate molecular sieve.
42. A washcoat composition as defined in clause 40 or 41, wherein the support material is a silica-alumina mixed oxide.
43. A washcoat composition as defined in clause 42, wherein the silica-alumina mixed oxide has a silica content in the range 1 to 40 wt %, 2 to 35 wt %, 5 to 35 wt % or 5 to 30 wt %.
44. A washcoat composition as defined in any of clauses 38 to 42, wherein the silica-alumina mixed oxide has a silica content in the range 2 to 10 wt %.
45. A washcoat composition as defined in clause 44, wherein the silica-alumina mixed oxide has a silica content of about 5 wt %.
46. A washcoat composition as defined in any of clauses 38 to 42, wherein the silica-alumina mixed oxide has a silica content in the range 25 to 40 wt %.

47. A washcoat composition as defined in clause 46, wherein the silica-alumina mixed oxide has a silica content of about 30 wt %.
48. A washcoat composition as defined in any of clauses 38 to 47, wherein the support material has a D90 particle size of ≤50 μm or ≤30 μm.
49. A washcoat composition as defined in any of clauses 38 to 48, wherein the support material is impregnated with a platinum group metal component.
50. A washcoat composition as defined in clause 49, wherein the platinum group metal component comprises platinum, palladium or a mixture of platinum and palladium.
51. A washcoat composition as defined in clause 50, wherein the platinum group metal component comprises platinum.
52. A washcoat composition as defined in clause 51, wherein the platinum group metal component is a platinum nitrate or a platinum acetate.
53. A washcoat composition as defined in any of clauses 38 to 52, wherein the metal oxide sol is a titania sol.
54. A washcoat composition as defined in any of clauses 38 to 53, wherein the metal oxide sol has a BET surface area of ≥100 m$^2$/g, ≥150 m$^2$/g, ≥200 m$^2$/g, ≥250 m$^2$/g or ≥300 m$^2$/g.
55. A method as defined in any of clauses 38 to 54, wherein the metal oxide sol has a D50 particle size of ≤1 μm, ≤0.5 μm or ≤0.2 μm.
56. A method as defined in any of clauses 38 to 55, wherein the metal oxide sol has a D90 particle size of ≤5 μm, ≤2 μm, ≤1 μm or ≤0.5 μm.
57. A washcoat composition as defined in any of clauses 38 to 56, wherein the liquid medium is water.
58. A washcoat composition as defined in any clauses 38 to 57, wherein the washcoat composition has a solids content of up to 50 wt %.
59. A washcoat composition as defined in clause 58, wherein the washcoat composition has a solids content in the range 20 to 40 wt % or 30 to 35 wt %.
60. A washcoat composition as defined in any of clauses 38 to 59 wherein the washcoat composition has a pH of <7, ≤5 or about 3.
61. A washcoat composition as defined in any of clauses 38 to 60, wherein the washcoat composition has a viscosity in the range 100-1000 centipoise.
62. A washcoat composition as defined in any of clauses 38 to 61, which further comprises organic additives.

The invention claimed is:

1. A method of preparing a catalyst article comprising steps:
   (a) preparing a washcoat composition by combining at least the following components:
      a support material comprising a mixed oxide, a mixture of oxides or a molecular sieve;
      a metal oxide sol comprising at least one of titania, silica or zirconia;
      a liquid medium;
   (b) applying the washcoat composition to a substrate to form a washcoating; and
   (c) drying and/or calcining the washcoating;
   wherein the method further comprises a step of impregnating the support material with a platinum group metal component;
   wherein the molecular sieve comprises (i) alumina and silica and/or zirconia; and
   wherein the metal oxide sol is a titania sol.
2. The method of claim 1, wherein the support material is a silica-alumina mixed oxide, a zirconia-alumina mixed oxide or an aluminosilicate molecular sieve.
3. The method of claim 1, wherein the support material is a silica-alumina mixed oxide.
4. The method of claim 3, wherein the support material is a silica-alumina mixed oxide having a silica content in the range 1 to 40 wt %.
5. The method of claim 3, wherein the support material is a silica-alumina mixed oxide having a silica content in the range 2 to 35 wt %.
6. The method of claim 3, wherein the support material is a silica-alumina mixed oxide having a silica content in the range 5 to 30 wt %.
7. The method of claim 1, wherein the support material has a D90 particle size of ≤50 μm.
8. The method of claim 1, wherein the support material is impregnated with PGM component prior to step (a) by contacting the support material with an impregnation solution, wherein the impregnation solution comprises the PGM component.
9. The method of claim 1, wherein the support material is impregnated with PGM component subsequent to step (a) and prior to step (b) by blending the washcoat composition formed in step (a) with an impregnation solution comprising the PGM component.
10. The method of claim 1, wherein the support material is impregnated with platinum group metal component subsequent to step (c), which method further comprises:
    (d) applying an impregnation solution to the substrate to form a second coating, wherein the impregnation solution comprises the PGM component; and
    (e) drying and/or calcining the second coating.
11. The method of claim 1, wherein the platinum group metal component comprises platinum, palladium or a mixture of platinum and palladium.
12. The method of claim 1, wherein the platinum group metal component is a platinum nitrate or a platinum acetate.
13. The method of claim 1, wherein the metal oxide of the metal oxide sol has a BET surface area of ≥100 m$^2$/g.
14. The method of claim 1, wherein the metal oxide sol has a D50 particle size of ≤1 μm.
15. The method of claim 1, wherein the metal oxide of the metal oxide sol has a BET surface area of ≥200 m$^2$/g.
16. The method of claim 1, wherein the metal oxide of the metal oxide sol has a BET surface area of ≥300 m$^2$/g.
17. The method of claim 1, wherein the metal oxide sol has a D50 particle size of ≤0.5 μm.

* * * * *